United States Patent
Chen et al.

(10) Patent No.: US 12,045,946 B2
(45) Date of Patent: Jul. 23, 2024

(54) ROTATING AND CROPPING IMAGES FOR VARIOUS FORMS OF MEDIA INCLUDING ANIMATION, COMICS, FILM, OR TELEVISION

(71) Applicant: SHANGHAI HODE INFORMATION TECHNOLOGY CO., LTD., Shanghai (CN)

(72) Inventors: Simin Chen, Shanghai (CN); Jie Li, Shanghai (CN); Shi Yao, Shanghai (CN); Biao Yan, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 390 days.

(21) Appl. No.: 17/448,295

(22) Filed: Sep. 21, 2021

(65) Prior Publication Data

US 2022/0005151 A1    Jan. 6, 2022

Related U.S. Application Data

(63) Continuation of application No. PCT/CN2019/128467, filed on Dec. 25, 2019.

(30) Foreign Application Priority Data

Mar. 25, 2019 (CN) .......................... 201910228955.5

(51) Int. Cl.
*G06K 9/00* (2022.01)
*G06T 3/147* (2024.01)
(Continued)

(52) U.S. Cl.
CPC ............ *G06T 3/147* (2024.01); *G06T 3/4038* (2013.01); *G06T 7/13* (2017.01); *G06T 7/194* (2017.01); *G06T 13/80* (2013.01)

(58) Field of Classification Search
CPC ..... G06T 13/00–80; G06T 2213/00–12; G06T 15/00–87; G06T 19/00–20;
(Continued)

(56) References Cited

U.S. PATENT DOCUMENTS

RE42,881  E  * 11/2011  Vallmajo ............ H04N 1/00132
                                                          382/199
8,427,483  B1 *  4/2013  Ward ...................... G06T 13/80
                                                          345/473
(Continued)

FOREIGN PATENT DOCUMENTS

CN      101789133 A      7/2010
CN      101937571 A      1/2011
(Continued)

OTHER PUBLICATIONS

International Search Report and Written Opinion for PCT/CN2019/128467, mailed Mar. 16, 2020, with translation, 8 pages.
(Continued)

*Primary Examiner* — Atiba O Fitzpatrick
(74) *Attorney, Agent, or Firm* — FisherBroyles, LLP

(57) ABSTRACT

A method is provided. The method includes: obtaining a picture to be processed, where the picture to be processed includes a plurality of pixels, and the plurality of pixels comprise first pixels for forming an image and second pixels for forming an image background; rotating the picture to be processed, where for each rotation angle, an intermediate picture is obtained; selecting at least two pictures from the picture to be processed and several intermediate pictures for calculating an area of a bounding box surrounding the image respectively; and removing second pixels outside the bounding box in a picture with the smallest area of bounding box to obtain a processed picture.

18 Claims, 10 Drawing Sheets

(51) Int. Cl.
*G06T 3/4038* (2024.01)
*G06T 7/13* (2017.01)
*G06T 7/194* (2017.01)
*G06T 13/80* (2011.01)

(58) Field of Classification Search
CPC . G06T 2200/00–36; G06T 2210/00–64; G06T 2210/12; G06T 2207/20021; G06T 7/62; G06T 2207/20132; G06T 2210/22; G06T 7/70; G06T 3/4038; G06T 2200/32; G06T 7/194; G06V 30/414
See application file for complete search history.

(56) References Cited

U.S. PATENT DOCUMENTS

| | | | |
|---|---|---|---|
| 2009/0110328 | A1 | 4/2009 | Minamino |
| 2012/0001924 | A1* | 1/2012 | Richardson ............ G06T 13/80 345/473 |
| 2013/0120401 | A1* | 5/2013 | Borysenko ............ G06T 13/80 345/473 |
| 2013/0286025 | A1* | 10/2013 | Spells, III ............ G06T 13/20 345/473 |
| 2015/0178988 | A1* | 6/2015 | Montserrat Mora ... G06T 17/20 345/420 |
| 2015/0199033 | A1 | 7/2015 | Fahn et al. |
| 2017/0161592 | A1 | 6/2017 | Su et al. |
| 2017/0221263 | A1* | 8/2017 | Wei ...................... G06T 17/205 |
| 2017/0228867 | A1 | 8/2017 | Baruch |
| 2020/0050835 | A1* | 2/2020 | Xu ............................ G06T 7/70 |

FOREIGN PATENT DOCUMENTS

| | | |
|---|---|---|
| CN | 102129705 A | 7/2011 |
| CN | 102509104 A | 6/2012 |
| CN | 103985114 A | 8/2014 |
| CN | 103996089 A | 8/2014 |
| CN | 104123742 A | 10/2014 |
| CN | 105498211 A | 4/2016 |
| CN | 106202744 A | 12/2016 |
| CN | 106875492 A | 6/2017 |
| CN | 109242787 A | 1/2019 |
| CN | 109308386 A | 2/2019 |
| CN | 109376383 A | 2/2019 |
| CN | 109377499 A | 2/2019 |
| CN | 109389558 A | 2/2019 |
| JP | 2001266138 A | 9/2001 |
| WO | 03/017204 A2 | 2/2003 |

OTHER PUBLICATIONS

Supplementary European Search Report, EP Application No. 19920847.1, issued Apr. 7, 2022, 2 pages.
"Solving Geometric Problems with the Rotating Calipers", Godfried Toussaint, School of Computer Science, McGill University, Montreal, Quebec, Canada, published in Proceedings of IEEE Melecon'83, Athens, Greece, May 1983, 8 pages.
C.K. Chan, et al., "Determination of the Minimum Bounding Box of an Arbitrary Solid: an Iterative Approach," DComputers and Structures 79, 2001, 1433-1449.
Hamzah Asyrani Sulaiman, et al.. "Distance Computation Using Axis Aligned Bounding Box (AABB) Parallel Distribution of Dynamic Origin Point," International Conference on Microelectronics, Communication and Renewable Energy (ICMiCR-2013), 6 pages.
Liu Chao, "Research and Implementation of Collision Detection Algorithm in Virtual Environment," Nanjing University of Aeronautics and Astronautics, The Graduate School College of Computer Science and Technology, Mar. 2018, 77 pages.
CN201910228955.5, "Office Action", Mar. 30, 2023, 16 pages.
Xu Can, "Research on Collision Detection Technology for Robot Production Line Simulation," A Dissertation Submitted for the Degree of Master, South China University of Technology, Guangzhou, China, Apr. 2017, 82 pages.
Yanyan Huang, "System Modeling and Simulation Technology and Application," National Defense Industry Press, Oct. 31, 2016, 6 pages.

* cited by examiner

ROTATING AND CROPPING IMAGES FOR VARIOUS FORMS OF MEDIA INCLUDING ANIMATION, COMICS, FILM, OR TELEVISION

CROSS REFERENCE TO RELATED APPLICATION

The present application is a continuation under 35 U.S.C. 111(a) of PCT International Application No. PCT/CN2019/128467, filed on Dec. 25, 2019, which claims priority to Chinese patent application No. 201910228955.5, filed on Mar. 25, 2019, the entire contents of which are hereby incorporated by reference in their entirety for all purposes.

TECHNICAL FIELD

The present application relates to data processing and particularly to a method of processing picture, a computing device, and a computer-program product.

BACKGROUND

In animation, comics, film and television, games and other related industries, it is needed to design and produce images of people, animals or appliances in a drawing software at the initial stage. Usually, these images are composed of a plurality of pictures. After the image produced by the drawing software is exported, and before performing the subsequent action designing and other processing, an image is divided into different image units, and each image unit includes one or more pictures to achieve control for a single image unit.

SUMMARY

The present application provides a method. The method includes: obtaining a picture to be processed, wherein the picture to be processed includes a plurality of pixels, and the plurality of pixels comprise first pixels for forming an image and second pixels for forming an image background; rotating the picture to be processed, wherein for each rotation angle, an intermediate picture is obtained; selecting at least two pictures from the picture to be processed and several intermediate pictures for calculating an area of a bounding box surrounding the image respectively; and removing second pixels outside the bounding box in a picture with the smallest area of bounding box to obtain a processed picture.

The present application also provides a computing device, which includes one or more processors; and one or more non-transitory computer-readable storage mediums containing instructions configured to cause the one or more processors to perform operations including the above method.

The present application also provides a non-transitory computer-program product tangibly embodied in a machine-readable non-transitory storage medium that includes instructions configured to cause one or more processors to perform operations including the above method.

DETAILED DESCRIPTION

Figure 1:
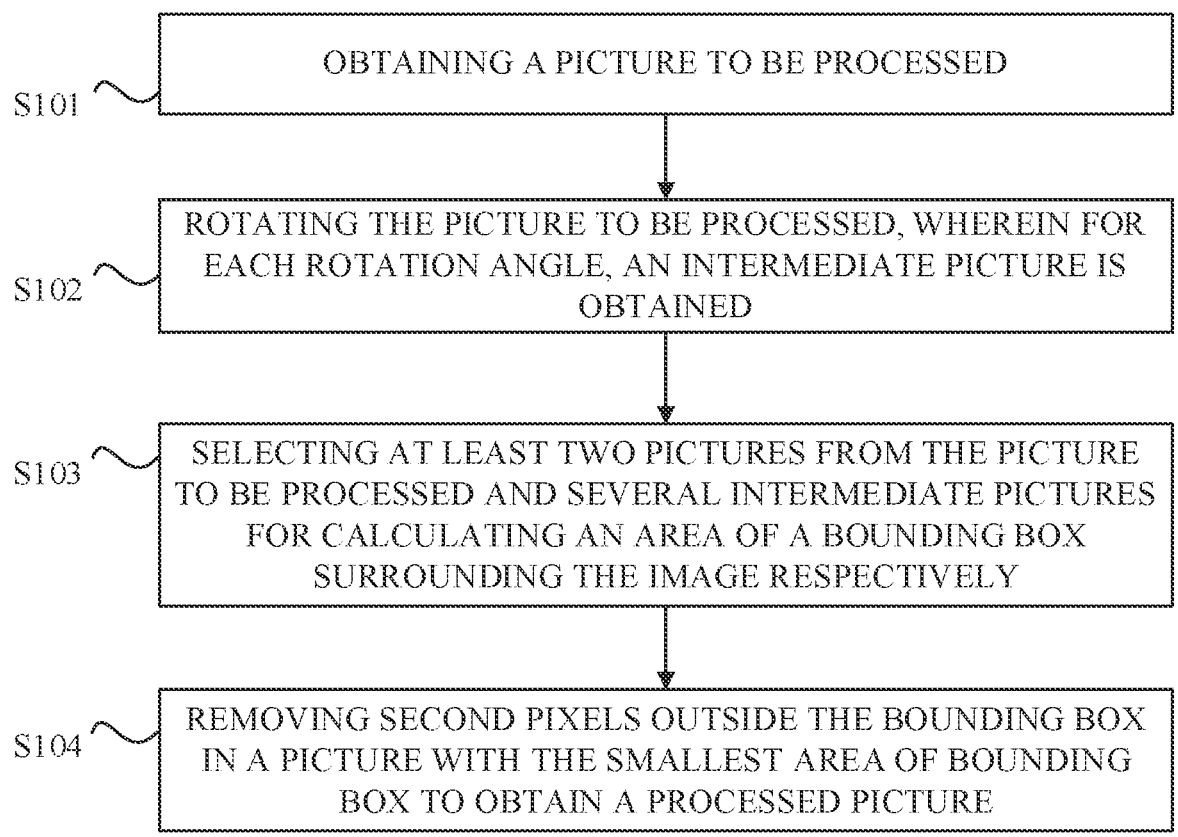
FIG. 1 is a flowchart of a method of processing picture according to some embodiments of the present application.

To make the embodiments and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

In the related art, when using Photoshop to produce image, the image is distributed in a plurality of layers. When the image is split into different image units, all layer attributes are hidden, and then the entire image is displayed, then it is divided and cropped according to the image. The inventor found that this processing method has the following two problems: first, size of a fragmented image formed after cropping is large, which limits a further improvement of the image loading speed and a further reduction of memory consumption of the subsequent processing program; second, this cropping method is slow, especially for complex images, which takes a long time to read data and display the image, and requires a large number of cropping steps, and the overall response time is long. In addition, the image splitting tool in the related art is a script tool of the Photoshop, and each time the image is split, the Photoshop needs to be opened, which is complicated to operate.

In view of this, the present application provides a method of processing picture, a computing device, and a computer-program product, which are used to solve the technical problems of large pictures, large size of generated atlas, and low utilization of atlas space in the related art.

In the method of processing picture provided by the present application, the picture to be processed is rotated, so that the picture to be processed is at different angles, that is, images in the picture are at different angles, and then a bounding box area surrounding the image at different angles is calculated to find the smallest image bounding box, and then in the picture of the smallest image bounding box, pixels that constitute the image background outside the bounding box are removed, thus, the size of the picture is reduced, and then the speed of subsequent programs to load the picture can be improved, and the memory consumption needed to process the picture can be reduced. In addition, when the atlas is generated, the size of the atlas can be reduced, the space utilization of the atlas can be improved, and the data loading speed of the atlas can be improved.

The method of processing picture can be used for processing atlas, thus a method of processing atlas is provided. In the method of processing atlas provided by the present application, a picture file to be processed includes a plurality of layers, each layer is regarded as a picture to be processed, and the picture to be processed is processed according to any one of the methods of processing picture provided by the present application. Finally, processed pictures are assembled into an atlas. Since the processed pictures processed by the method of processing picture provided by the present application are smaller, the atlas formed is also smaller, and more pictures can be set in the same size atlas, which improves the space utilization of the atlas and reduces the memory occupied by subsequent programs in the process of processing the atlas. In addition, the present application directly reads the file stream of the picture file to be processed, takes each layer of the picture file to be processed as a separate picture, the picture can be cropped at a pixel level. Compared with the prior art, which reads the data, draws the image, hides all layer attributes, and directly divides the whole image, the overall processing speed is faster.

The method of processing picture can be used for producing animation, thus a method of producing animation is provided. In the method of producing animation provided by the present application, the atlas corresponding to the obtained animation is an atlas obtained by any one of the methods of processing atlas provided by the present application. Pictures in the atlas are obtained by any one of the methods of processing pictures provided by the present application, therefore, the pictures in the atlas have a corresponding rotation angle relative to the original pictures to be processed. In the method of producing animation, after the atlas is obtained, each picture in the atlas is rotated back to the original angle to obtain the initial angle picture. In the initial angle picture, the angle of the image is restored to the original angle, and then each initial angle picture is animated. On the one hand, because the atlas occupies a small amount of memory, during the animation production process, the device memory is reduced, on the other hand, the image is ensured at the original angle before animation production, without the need for the user to adjust the angle of the image, which improves the user's experience.

The specific embodiments of the method of processing picture, the method of processing atlas, and the method of producing animation provided by the present application, the apparatus corresponding to each method, the computing device, and the computer-program product will be described in detail below through respective embodiment.

The embodiments of the present application provide a method of processing picture. Specifically, FIG. 1 is a flowchart of the method of processing picture according to some embodiments of the present application. As shown in FIG. 1, the method of processing picture provided in the embodiments include the following step S101 to step S104.

Step S101: obtaining a picture to be processed.

The picture to be processed includes a plurality of pixels, and the plurality of pixels include first pixels for forming an image and second pixels for forming an image background. Each second pixel forming the image background may adopt the same gray scale, and the first pixel forming the image has a corresponding gray scale at each position according to a specific image.

According to some embodiments, the second pixels are transparent pixels, and the first pixels are non-transparent pixels, that is, the first pixels do not have transparency, and the second pixels have a predetermined transparency. Therefore, in the processing of the pixel level, the first pixel and the second pixel can be quickly identified through the transparency of the pixel, and the speed of pixel processing is increased, thereby increasing the speed of picture processing.

Step S102: rotating the picture to be processed, where for each rotation angle, an intermediate picture is obtained.

According to some embodiments, first, a bounding box is determined when the image in the picture to be processed is at an original angle, which is defined as an original bounding box. Then the picture is rotated with a center of the original bounding box as the rotation center, and an intermediate picture is obtained at each rotation angle. Through rotation, the angle of the image in each of the pictures to be processed and the intermediate pictures is different, and correspondingly, the bounding box area of the image in each picture is also different. The bounding box is a geometry with a size slightly larger than the image, which surrounds the whole image and has simple properties.

Figure 2:
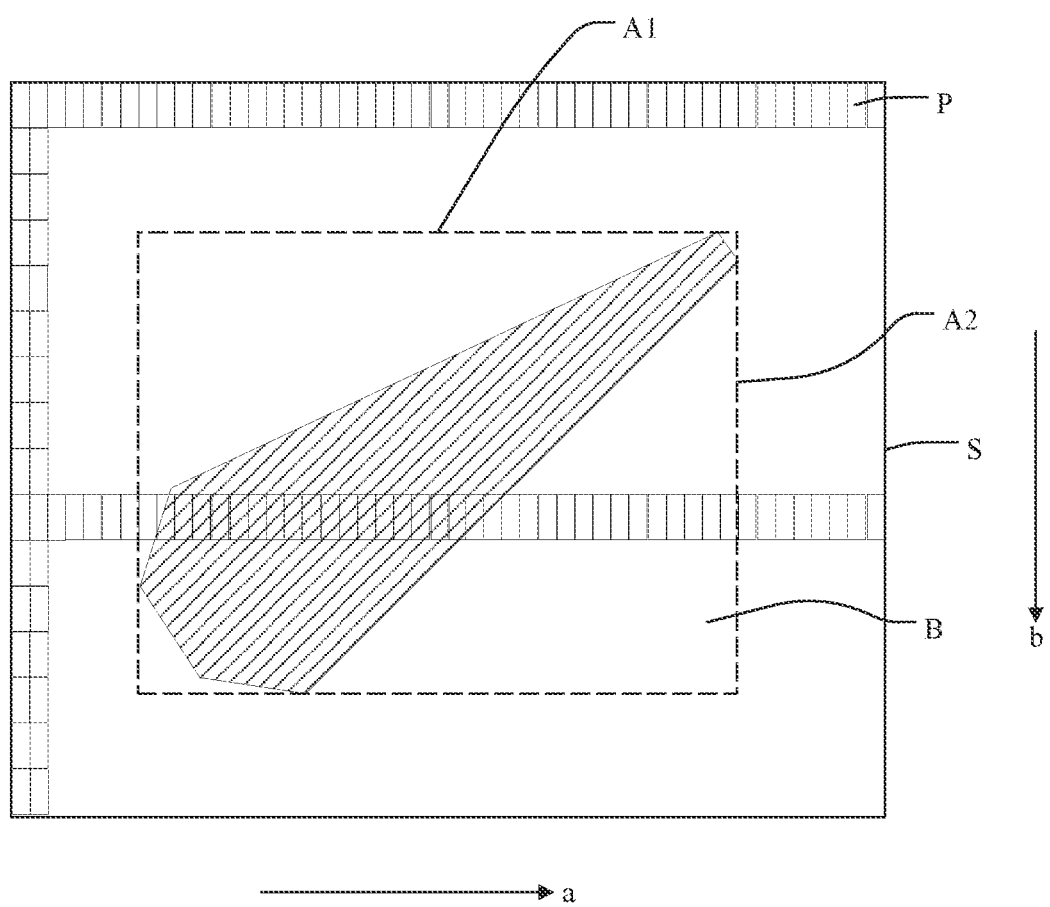
FIG. 2 is a schematic diagram of an image bounding box in a picture according to some embodiments of the present application.
Figure 3:
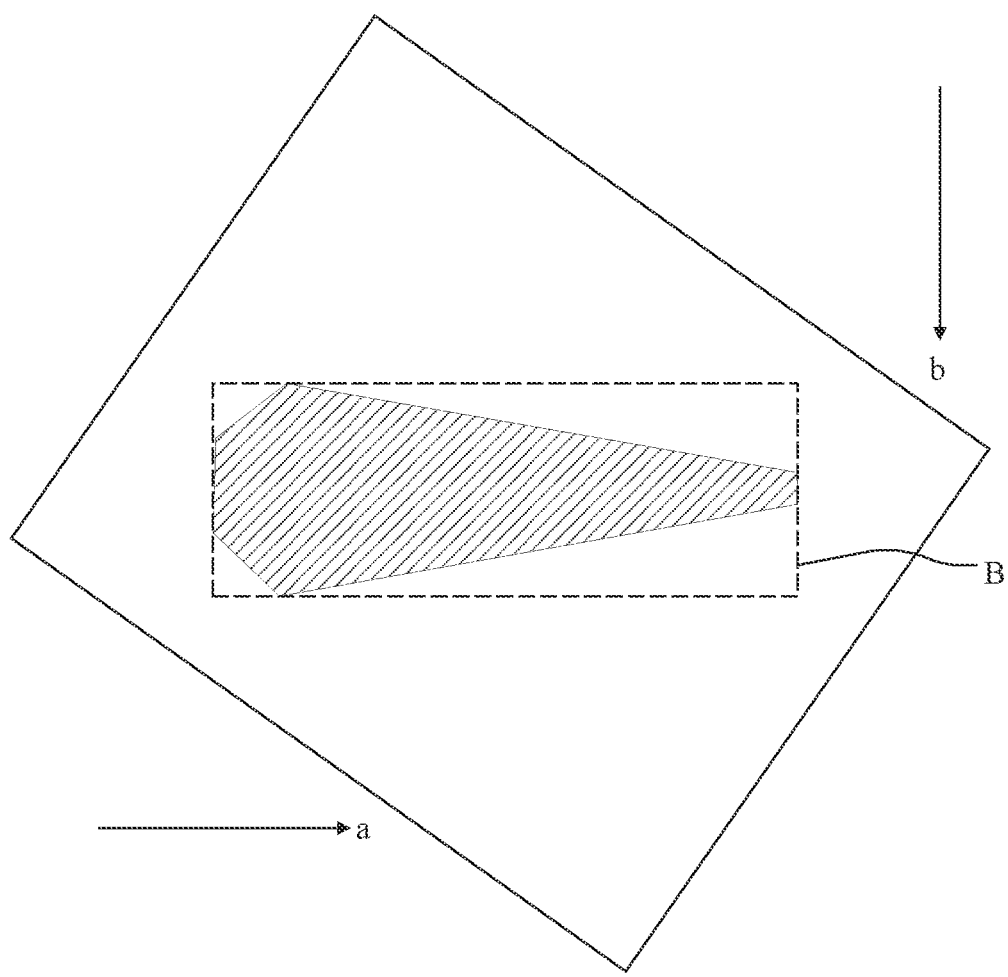
FIG. 3 is a schematic diagram of the image bounding box in another picture according to some embodiments of the present application.

FIG. 2 is a schematic diagram of the image bounding box in a picture according to some embodiments of the present application, and FIG. 3 is a schematic diagram of the image bounding box in another picture according to some embodiments of the present application, as shown in FIG. 2 and FIG. 3, the pictures shown in the two figures are at different angles, the same image is at different angles, and the area of a bounding box B is different.

It should be noted that in the specific step of rotating the picture to be processed, data of the whole picture can be processed to realize the rotation of the whole picture, or the data of a partial area of the picture can be processed to realize the rotation of the partial area including the image. In addition, when the image is at different angles, the area of the corresponding bounding box is different, but the outline and angle of the bounding box are the same.

Step S103: selecting at least two pictures from the picture to be processed and several intermediate pictures for calculating an area of a bounding box surrounding the image respectively.

It should be noted that the number of the intermediate pictures is not limited in the embodiments. In the step, at least two pictures are selected from the picture to be processed and several intermediate pictures to calculate the area of the bounding box of the image.

Step S104: removing second pixels outside the bounding box in a picture with the smallest area of bounding box to obtain a processed picture.

Selecting the picture with the smallest bounding box area to remove the second pixels outside the bounding box can remove more second pixels, thereby reducing the size of the processed picture.

Using the method of processing picture provided by the embodiments, picture data obtained is pixel-level data or can be converted into pixel-level data, the pixels forming the image are the first pixels, and the pixels forming the image background are the second pixels. By rotating the picture to be processed, pictures with images at different angles can be obtained. At least two images are selected to calculate the area of the bounding box surrounding the image respectively. Finally, the second pixels outside the bounding box in the picture with the smallest area of bounding box is deleted, and more second pixels are deleted, thus, on the basis of not affecting the image expression, the size of the picture is reduced, which can improve the speed of subsequent programs to load the picture, and reduce the memory consumption needed of picture processing. In addition, when the atlas is generated, the size of the atlas can be reduced, the space utilization of the atlas can be improved, and the data loading speed of the atlas can be improved.

In some embodiments, in the above step S102, rotating the picture to be processed at a predetermined interval angle within a predetermined angle range. In the above step S103, selecting all pictures from the picture to be processed and the several intermediate pictures, and calculating the area of the bounding box surrounding the image respectively, so that in step S104, the smallest bounding box can be found among the bounding boxes of the images at various angles within the predetermined angle range to further reduce the size of the picture.

In some embodiments, the predetermined angle range is 0 degree to 90 degrees, and the predetermined interval angle is 1 degree, that is, in the above step S102, the picture to be processed is rotated every 1 degree from 0 to 90 degrees to get an intermediate picture, and a total of 89 intermediate pictures are obtained. In the above step S103, the area of the bounding box of the picture to be processed and the 89 intermediate pictures are calculated respectively. Thus, in step S104, the smallest bounding box can be found among the bounding boxes of the 90-angle images, that is, 90 bounding boxes, so as to further reduce the size of the picture. Between 0 degree and 90 degrees, the area of the bounding box when the image is at θ degrees is equal to the area of the bounding box when the image is at 90*N+θ degrees, where N=1, 2 or 3. Therefore, the smallest bounding box can be found in the above 90 bounding boxes, that is, the smallest bounding box can be found in the 360 degrees rotating space. Therefore, setting the predetermined angle range from 0 degree to 90 degrees and determining the minimum bounding box between 0 degree and 90 degrees can avoid redundant calculation and reduce the amount of data calculation. Setting the predetermined interval angle to 1 degree can balance between the number of intermediate pictures and the accuracy of data.

In some embodiments, please continue to refer to FIG. 2, FIG. 2 shows a picture S to be processed, which includes a plurality of pixels P. and coordinates of each of the pixels P in a first direction a are first coordinates x, and coordinates in a second direction b are second coordinates y. The first direction a is perpendicular to the second direction b, that is, each of the pixels P is arranged in the first direction a and the second direction b respectively to form a pixel array. In the picture S to be processed, the bounding box B of the image includes two first edges A1 extending in the first direction a and two second edges A2 extending in the second direction b. It should be noted that FIG. 2 only shows the outline of some pixels, and the edge of the image is also simplified as a straight line at the same time. In fact, at pixel level, the edge of the image should be serrated.

Using the method of processing picture provided in the embodiments, the bounding box is set to be a rectangle, the graph is simple, and the amount of geometric calculation in the data processing process is small. At the same time, the extension direction of the frame of the bounding box is consistent with the pixel arrangement direction, so that when the second pixels outside the bounding box is deleted, the amount of deletion can be increased to reduce the image size as much as possible.

Figure 4:
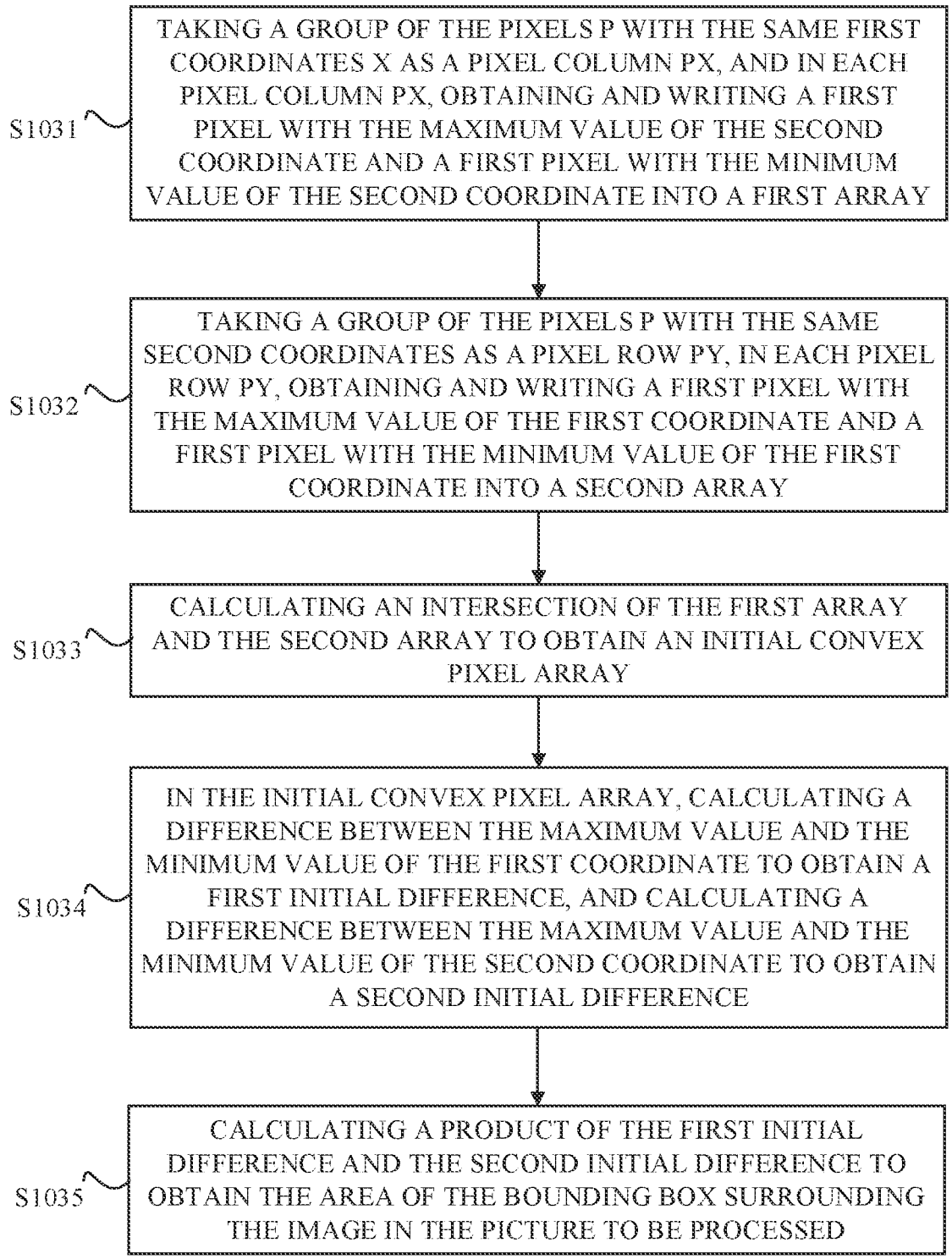
FIG. 4 is a schematic diagram of steps of calculating a bounding box area surrounding an image on a picture to be processed in the method of processing picture according to some embodiments of the present application.
Figure 5:
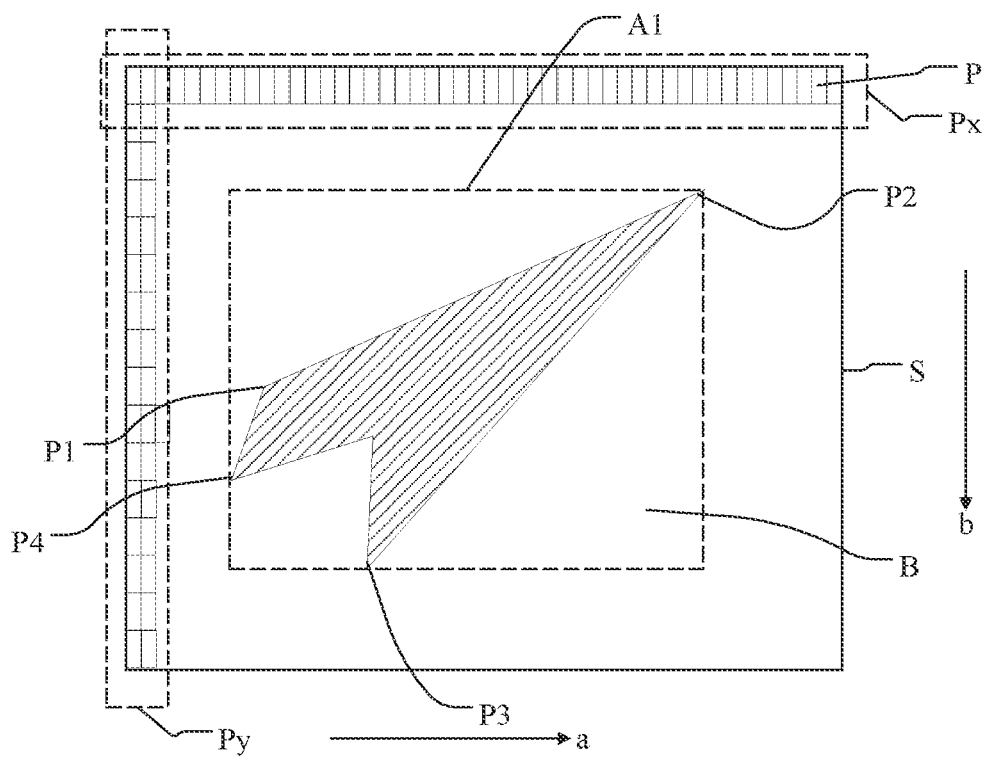
FIG. 5 is a schematic diagram of calculating the bounding box area according to some embodiments of the present application.

In some embodiments, FIG. 4 is a schematic diagram of the steps of calculating the area of the bounding box surrounding the image on the picture to be processed in the method of processing picture according to some embodiments of the present application. FIG. 5 is a schematic diagram of calculating the area of the bounding box according to some embodiments of the present application. As shown in FIGS. 4 and 5, in step S103, the step of calculating the area of the bounding box surrounding the image in the picture to be processed specifically includes the following steps S1031 to S1035. The following steps are all steps for the picture to be processed, specifically:

Step S1031, taking a group of the pixels P with the same first coordinates x as a pixel column Px, and in each pixel column Px, obtaining and writing a first pixel with the maximum value of the second coordinate and a first pixel with the minimum value of the second coordinate into a first array.

Step S1032, taking a group of the pixels P with the same second coordinates as a pixel row Py, in each pixel row Py, obtaining and writing a first pixel with the maximum value of the first coordinate and a first pixel with the minimum value of the first coordinate into a second array.

Specifically, for the above steps S1031 and S1032, in some embodiments, the picture to be processed can be scanned from left to right in the first direction, and for each pixel column, the top and bottom non-transparent pixels are found and stored in the first array. And the picture to be processed can be scanned from top to bottom in the second direction, for each pixel row, the leftmost and rightmost non-transparent pixels are found and stored in the second array.

Step S1033, calculating an intersection of the first array and the second array to obtain an initial convex pixel array.

Through the above two steps, the pixels in the first array and the second array obtained constitute the edges of the image. The intersection of the first array and the second array is calculated, and the pixels obtained are vertexes at the edge of the image, and the present application names the intersection as the initial convex pixel array.

As shown in FIG. 5, the pixels included in the initial convex pixel array are pixel P1, pixel P2, pixel P3, pixel P4. It should be noted that FIG. 5 only schematically shows an initial convex pixel array corresponding to an image, and does not constitute a limitation on the image in the present application.

Step S1034: in the initial convex pixel array, calculating a difference between the maximum value of the first coordinate and the minimum value of the first coordinate to obtain a first initial difference, and calculating a difference between the maximum value of the second coordinate and the minimum value of the second coordinate to obtain a second initial difference.

Step S1035: calculating a product of the first initial difference and the second initial difference to obtain the area of the bounding box surrounding the image in the picture to be processed.

Please continue to refer to FIG. 5, in the initial convex pixel array, the maximum value of the first coordinate is the first coordinate x2 of the pixel P2, the minimum value of the first coordinate is the first coordinate x4 of the pixel P4, the maximum value of the second coordinate is the second coordinate y3 of the pixel P3, and the minimum value of the second coordinate is the second coordinate y2 of the pixel P2, then the product obtained by (x2−x4)*(y3−y2) is the area if the bounding box B.

In some embodiments, in step S102, the rotating the picture to be processed, specifically includes the following steps: determining a center of the bounding box of the image in the picture to be processed to obtain an initial center point O; rotating coordinates of each pixel in the initial convex pixel array around the initial center point O to obtain an intermediate convex pixel array.

In the method of processing picture provided in the embodiments, the rotation of the processed picture is simplified to the rotation of the convex pixel array, which reduces the amount of data processing.

In some embodiments, in step S103, the step of calculating the area of the bounding box surrounding the image in the intermediate picture includes: in the intermediate convex pixel array, calculating a difference between the maximum value of the first coordinate and the minimum value of the first coordinate to obtain a first intermediate difference, and calculating a difference between the maximum value of the second coordinate and the minimum value of the second coordinate to obtain a second intermediate difference; calculating a product of the first intermediate difference and the second intermediate difference to obtain the area of the bounding box surrounding the image in the intermediate picture.

Compared with directly obtaining the vertexes of the image in the intermediate picture for calculation, in the method of processing picture provided in the embodiments, the area of the bounding box surrounding the image in the intermediate picture is calculated based on the above-mentioned intermediate convex pixel array, the calculation complexity is simplified and the amount of data processing is reduced.

In some embodiments, in step S101, the step of obtaining a picture to be processed, includes: obtaining a picture file in PhotoShop Document (PSD) format. The picture file in the PSD format is an image format file of Photoshop itself, and is a design file of Photoshop. Obtaining a layer in the picture file to obtain the picture to be processed; removing the second pixels outside the bounding box in a picture with the smallest area of bounding box to obtain a processed picture, after the processed picture is obtained, the method of processing picture further includes: storing the processed picture in Portable Network Graphics (PNG) format, where PNG is a bit image format with lossless compression.

Using the method of processing picture provided in the embodiments, the picture to be processed is a layer derived from the PSD format, and finally the processed picture is stored in the PNG format to facilitate subsequent calls of other picture processing tools.

The above are the embodiments of the method of processing picture provided by the embodiments of the present application. The method of processing atlas provided by the present application includes the above-mentioned method of processing picture. Therefore, in the following description of the method of processing atlas provided by the present application, the description of the above method of processing picture is relatively brief, and the specific technical features and corresponding technical effects can be referred to the above.

Figure 6:
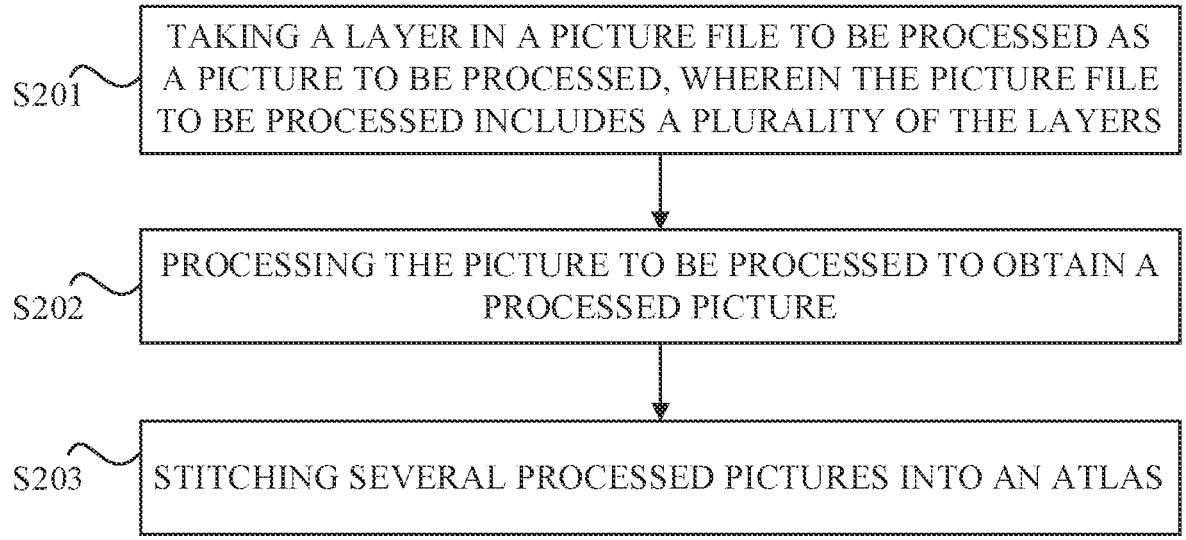
FIG. 6 is a flowchart of a method of processing atlas according to some embodiments of the present application.

Some embodiments of the present application provide a method of processing atlas. Specifically, FIG. 6 is a flowchart of a method of processing atlas according to some embodiments of the present application. As shown in FIG. 6, the method of processing atlas provided in the embodiments include the following steps S201 to S203.

Step S201: taking a layer in a picture file to be processed as a picture to be processed, the picture file to be processed includes a plurality of the layers.

In the step, the obtained picture file in the PSD format is a file stream of the picture file, and the specific method for reading the file stream can be an existing reading method in the related art.

Step S202: processing the picture to be processed to obtain a processed picture.

The step can be specifically processed by any one of the methods of processing picture provided by the present application, referring to the above for details.

Step S203: stitching several processed pictures into an atlas.

Using the method of processing atlas provided in the embodiments, the picture file in PSD format can be processed into atlas. During the processing, each layer in the picture file is processed as a picture to be processed, and a smaller picture is obtained after processing, then it is stitched into an atlas, so that the resulting atlas formed is also smaller, and more pictures can be set in the same size atlas, which improves the space utilization of the atlas and reduces the memory occupied by subsequent programs in the process of processing the atlas. In addition, the present application directly reads the file stream of the picture file to be processed, and takes each layer of the picture file to be processed as a separate picture. The picture can be cropped at the pixel level, and compared with the related art drawing an image after reading the data, hides all layer attributes, and directly divides the whole image, the overall processing speed is faster.

In some embodiments, the following Table 1 shows a time-consuming comparison between using the JSX plug-in of Photoshop in the related art and using the embodiments of the present application to crop a PSD format picture file into images and put them together into an atlas:

TABLE 1

| time-consuming comparison table of the related art and the present application | | |
|---|---|---|
| | time consumed of JSX plug-in | time consumed of the embodiments of the present application |
| 48 layers, 2000*2000 | 48 seconds | 8 seconds |
| 48 layers, 4000*4000 | 108 seconds | 18 seconds |
| 39 layers, 500*400 | 28 seconds | 0.2 seconds |
| 36 layers, 1337*752 | 47 seconds | 0.9 seconds |

As shown in Table 1 above, for 48 layers, the file in the PSD format with size of 2000*2000, it takes 48 seconds for the JSX plug-in to read data, draw images, and then process them into atlas: and it takes 8 seconds for the embodiments of the application to read the file stream and process the images into the atlas. For 48 layers, a file image in the PSD format with the size of 4000*4000, it takes 108 seconds for the JSX plug-in to read the data, draw the images, and then process the images into the atlas, and it takes 18 seconds for the embodiments of the application to read the file stream and process the images into the atlas. For 39 layers, the picture file in the PSD format with the size of 500*400, it takes 28 seconds for the JSX plug-in to read the data, draw the images, and then process the images into the atlas, and it takes 0.2 seconds for the embodiments of the application to read the file stream and process the images into the atlas. For 36 layers, the image file of PSD format with the size of 1337*752, it takes 47 seconds for the JSX plug to read the data, draw the images, and then process the images into the atlas, and it takes 0.9 seconds for the embodiments of the application to read the file stream and process the images into the atlas. It can be seen that compared with the related art, the overall processing speed of the method of processing atlas provided by the embodiments of the application is faster.

In some embodiments, the method of processing atlas further includes: generating an atlas mapper info file. The atlas mapper info file includes a name of the processed picture, a relative rotation angle between the processed picture and the corresponding picture to be processed, and coordinates of a center point of the processed picture, a width of the processed picture, and a height of the processed picture.

Using the method of processing atlas provided in the embodiments, the atlas mapper info file is generated after the atlas is formed. For example, the atlas mapper info file is in the JSON format, and in the subsequent processing of the atlas, relevant parameters can be obtained by parsing the atlas mapper info file for further processing.

Figure 7:
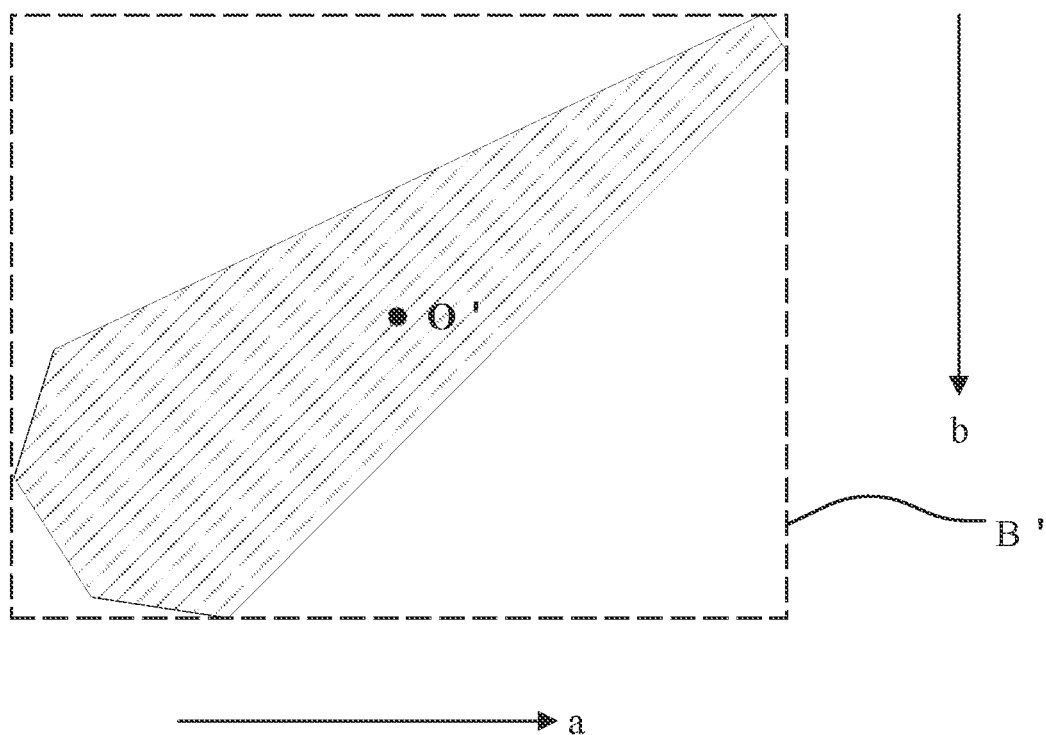
FIG. 7 is a schematic diagram of the picture to be processed according to some embodiments of the present application.
Figure 8:
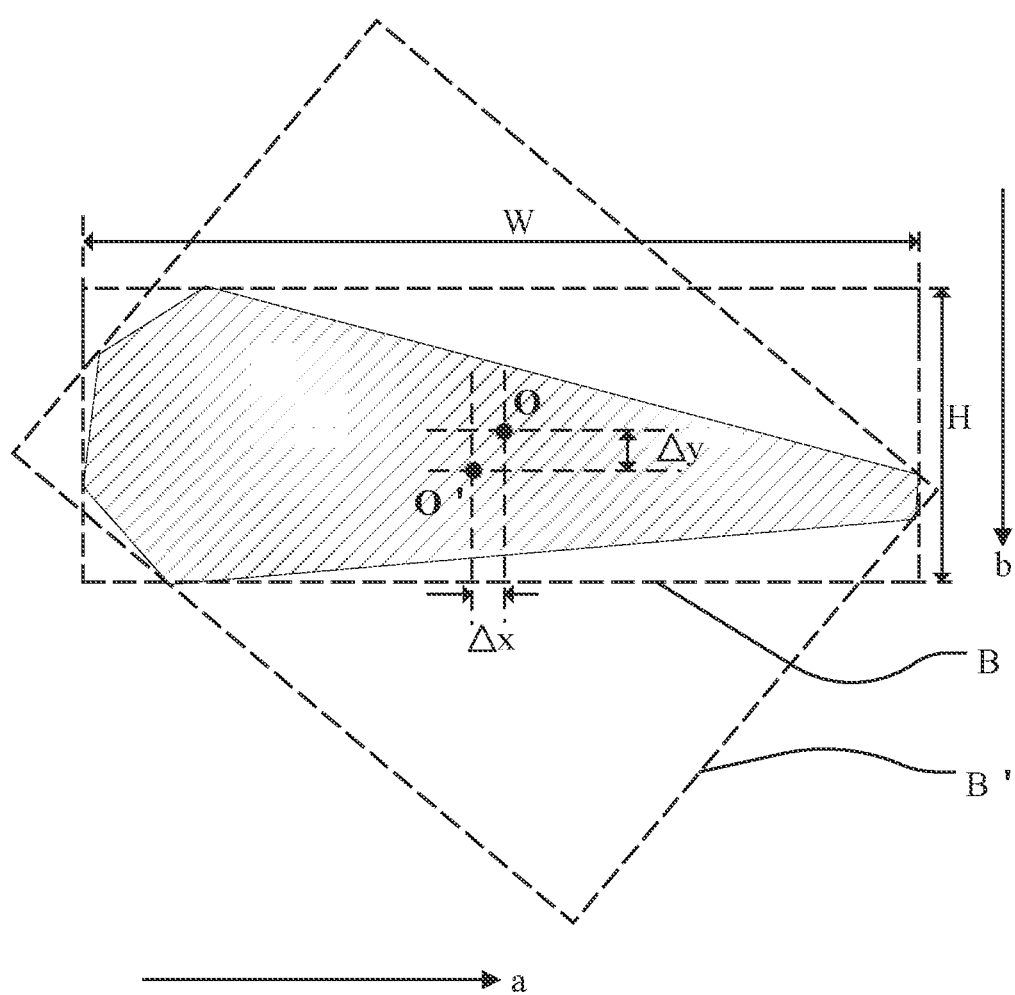
FIG. 8 is a schematic diagram of an intermediate picture according to some embodiments of the present application.

FIG. 7 is a schematic diagram of a picture to be processed according to some embodiments of the present application, and FIG. 8 is a schematic diagram of an intermediate picture according to some embodiments of the present application. In some embodiments, as shown in FIG. 7, in the picture to be processed, a bounding box B' has a center point O', and after the bounding box B' is rotated around the center point O', the intermediate picture is obtained as shown in the FIG. 8. In the intermediate picture shown in FIG. 8, the center point O ($x_o$, $y_o$) of the new bounding box B has a certain offset from the original center point O'. The offset in the first direction a is defined as $\Delta x$, the offset in the second direction b is defined as $\Delta y$. If the intermediate picture shown in FIG. 8 is the picture when the bounding box of the image is the smallest, therefore, the coordinates O ($x_o$, $y_o$) of the center point of the processed picture is calculated using the following formula:

$$x_o = \frac{x_{max} + x_{min}}{2} + \Delta x$$
$$y_o = \frac{y_{max} + y_{min}}{2} + \Delta y$$

a width W of the processed picture is calculated by the following formula:

$$W = x_{max} - x_{min}$$

a height H of the processed picture is calculated by the following formula:

$$H = y_{max} - y_{min}$$

where $x_{max}$ is the maximum value of first coordinates of pixels in the processed picture, $x_{min}$ is the minimum value of the first coordinates of the pixels in the processed picture, and $y_{max}$ is the maximum value of second coordinates of the pixels in the processed picture, $y_{min}$ is the minimum value of the second coordinates of the pixels in the processed picture, $\Delta x$ is an offset of the center point O ($x_o$, $y_o$) of the processed picture relative to an initial center point O' of the picture to be processed in a first direction a, $\Delta y$ is an offset b of the center point O ($x_o$, $y_o$) of the processed picture relative to the initial center point of the picture to be processed in a second direction, where the first coordinates are coordinates in the first direction a, and the second coordinates are coordinates in the second direction b.

In some embodiments, the step of generating an atlas mapper info file, includes: writing a layer name corresponding to the processed picture into a name of the processed picture in accordance with a determination that layer names corresponding to the several processed pictures differ from one another; and writing the layer name and a layer serial number into the name of the processed picture in accordance with a determination that layer names corresponding to two or more of the several processed pictures are the same, where the layer name and the layer serial number correspond to the processed pictures.

Using the method of processing atlas provided by the embodiments, the name of the corresponding layer is reflected in the name of the processed picture, so as to improve the readability of the data in subsequent processing process. At the same time, when different layers use the same name, the layer serial number is further introduced into the name of the processed picture, so as to avoid confusion in the name of the processed picture.

In some embodiments, in step S201, when a layer in the picture file in PSD format is taken as the picture to be processed, the attributes of the layer is determined. A layer in the image file in PSD format is taken as a picture to be processed in accordance with a determination that the layer is not a text layer, a background layer or a hidden layer. When the layer is the text layer, the background layer or the hidden layer, the text layer, the background layer or the hidden layer are not processed.

The method of processing atlas provided by the embodiments do not process the text layer, the background layer or the hidden layer, which reduces the amount of data processing without causing image data loss.

Figure 9:
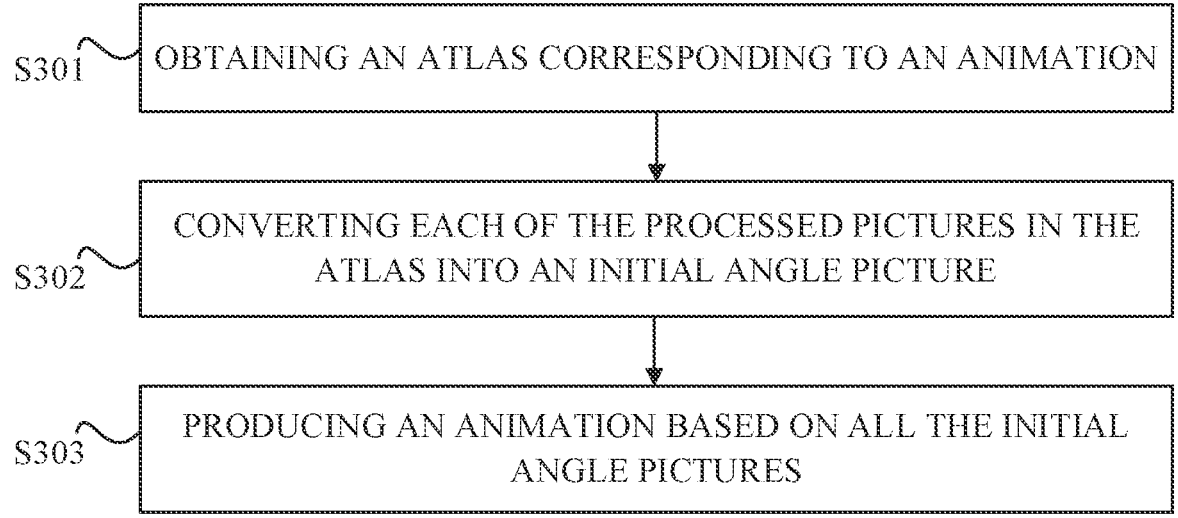
FIG. 9 is a flowchart of a method of producing animation according to some embodiments of the present application.

The embodiments of the present application provide a method of producing animation. Specifically. FIG. 9 is a flowchart of the method of producing animation according to some embodiments of the present application. As shown in FIG. 9, the method of producing animation provided in the embodiments include the following steps S301 to S303.

Step S301: obtaining an atlas corresponding to an animation;

The atlas can be obtained by any of the method of processing atlas provided by the present application, please refer to the above for details.

Step S302: converting each of the processed pictures in the atlas into an initial angle picture.

The initial angle picture is a picture formed by setting the processed picture at an angle of the picture to be processed.

Step S303: producing an animation based on all the initial angle pictures.

Using the method of producing animation provided by the embodiments, and using the atlas processed by the method of processing atlas provided by the present application, when the atlas is being animated, each picture in the atlas is now converted into an initial angle picture, so that the image in the picture is consistent with the initial angle. On the one hand, because the atlas occupies a small memory, the device memory is reduced during the animation production process, on the other hand, before making the animation, the image is ensured at the original angle, and there is no need for users to adjust the angle of the image, so as to improve user experience.

Figure 10:
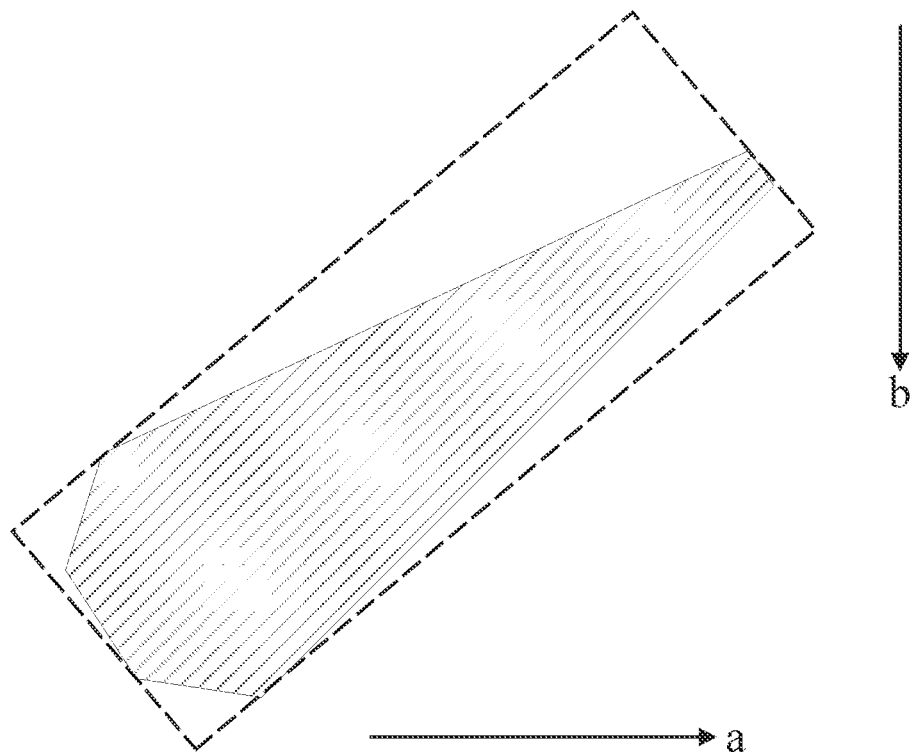
FIG. 10 is a schematic diagram of an initial angle picture according to some embodiments of the present application.

In some embodiments, in step S302, when each of the processed pictures in the atlas is converted into an initial angle picture, a center point and an angle parameter of the processed picture is obtained, the center point and the angle parameter can be obtained from the atlas mapper info file of the processed picture. The angle parameter is a relative rotation angle between the processed picture and the corresponding picture to be processed. Then the processed picture is rotated around the center point of the processed picture according to the angle parameter. As shown in FIG. 10, FIG. 10 is a schematic diagram of an initial angle image according to some embodiments of the present application. Compared FIG. 7 with FIG. 10, the angle of the image is the same.

Figure 11:
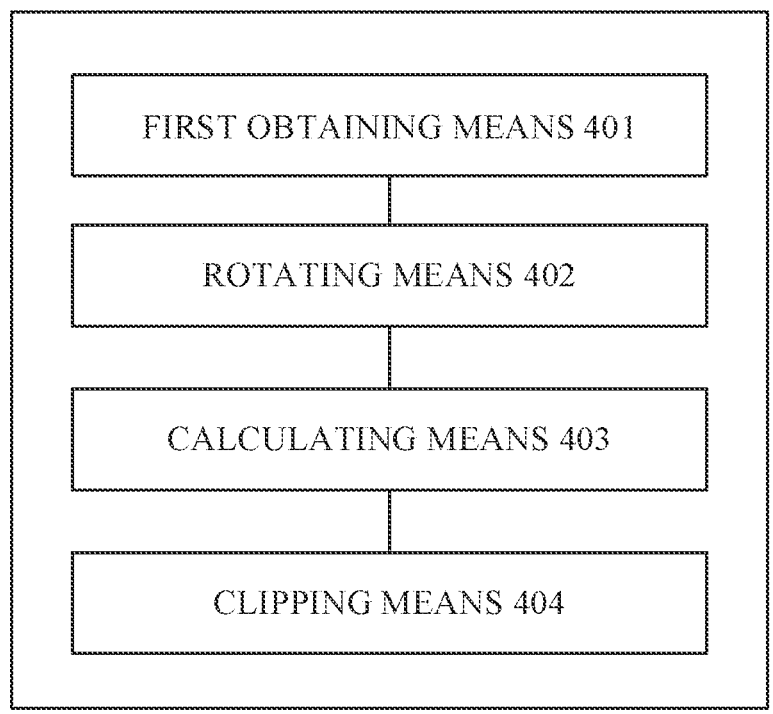
FIG. 11 is a block diagram of an apparatus of processing picture according to some embodiments of the present application.

Corresponding to the embodiments above, embodiments of the present application provide an apparatus of processing picture. FIG. 11 is a block diagram of the apparatus of processing picture according to some embodiments of the present application. As shown in FIG. 11, the apparatus includes: a first obtaining means 401, a rotating means 402, a calculating means 403, and a clipping means 404.

The first obtaining means 401 for, obtaining a picture to be processed, where the picture to be processed includes a plurality of pixels, and the plurality of pixels include first pixels for forming an image and second pixels for forming an image background. The rotating means 402 for, rotating the picture to be processed, where for each rotation angle, an intermediate picture is obtained. The calculating means 403 for, selecting at least two pictures from the picture to be processed and several intermediate pictures for calculating an area of a bounding box surrounding the image respectively. The clipping means 404 for, removing second pixels outside the bounding box in a picture with the smallest area of bounding box to obtain a processed picture.

According to some embodiments, the specific steps performed by the rotating means 402 include: rotating the picture to be processed at a predetermined interval angle within a predetermined angle range. The specific steps performed by the calculating means 403 include: selecting all pictures from the picture to be processed and the several intermediate pictures for calculating the area of the bounding box surrounding the image respectively.

According to some embodiments, coordinates of the pixels in a first direction are first coordinates, and coordinates in a second direction are second coordinates, where the first direction is perpendicular to the second direction, and in the picture to be processed, the bounding box includes two first edges extending in the first direction and two second edges extending in the second direction.

According to some embodiments, when the calculating means 403 calculates the area of the bounding box surrounding the image in the picture to be processed, the steps performed include: for the picture to be processed, taking a group of the pixels with the same first coordinates as a pixel column, and in each pixel column, obtaining and writing a first pixel with the maximum value of the second coordinate and a first pixel with the minimum value of the second coordinate into a first array; taking a group of the pixels with the same second coordinates as a pixel row, in each pixel row, obtaining and writing a first pixel with the maximum value of the first coordinate and a first pixel with the minimum value of the first coordinate into a second array; calculating an intersection of the first array and the second array to obtain an initial convex pixel array, in the initial convex pixel array, calculating a difference between the maximum value of the first coordinate and the minimum value of the first coordinate to obtain a first initial difference, and calculating a difference between the maximum value of the second coordinate and the minimum value of the second coordinate to obtain a second initial difference; calculating a product of the first initial difference and the second initial difference to obtain the area of the bounding box surrounding the image in the picture to be processed.

According to some embodiments, the specific steps performed by the rotating means 402 include: determining a center of the bounding box of the image in the picture to be processed to obtain an initial center point; rotating coordinates of each pixel in the initial convex pixel array around the initial center point to obtain an intermediate convex pixel array.

According to some embodiments, when the calculation means 403 calculates the area of the bounding box surrounding the image in the intermediate picture, the steps performed include: in the intermediate convex pixel array, calculating a difference between the maximum value of the first coordinate and the minimum value of the first coordinate to obtain a first intermediate difference, and calculating a difference between the maximum value of the second coordinate and the minimum value of the second coordinate to obtain a second intermediate difference; calculating a product of the first intermediate difference and the second intermediate difference to obtain the area of the bounding box surrounding the image in the intermediate picture.

According to some embodiments, the predetermined angle range is 0 degree to 90 degrees, and the predetermined interval angle is 1 degree.

According to some embodiments, the second pixels are transparent pixels, and the first pixels are non-transparent pixels.

According to some embodiments, the steps performed by the first obtaining means 401 include: obtaining a picture file in PSD format; and obtaining a layer in the picture file to obtain the picture to be processed. The device further includes a storing means, storing the processed picture in PNG format.

Figure 12:
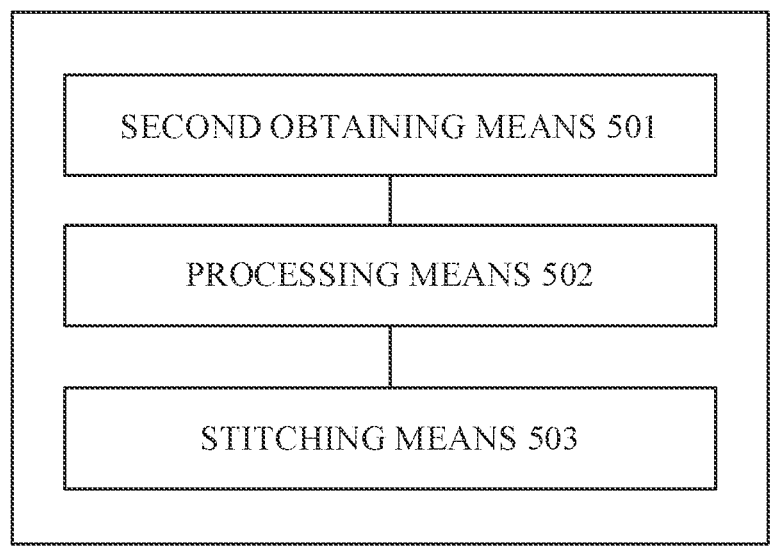
FIG. 12 is a block diagram of an apparatus of processing atlas according to some embodiments of the present application.

Corresponding to the embodiments above, embodiments of the present application provide an apparatus of processing atlas. FIG. 12 is a block diagram of the apparatus of processing atlas according to some embodiments of the present application. As shown in FIG. 12, the apparatus includes: a second obtaining means 501, a processing means 502, and a stitching means 503.

The second obtaining means 501 for, taking a layer in a picture file to be processed as a picture to be processed, where the picture file to be processed includes a plurality of the layers. The processing means 502 for, processing the picture to be processed to obtain a processed picture, where the processed picture corresponds to the picture to be processed. Specifically, any method of processing picture provided by the present application can be used for processing, or the processing means 502 includes any apparatus of processing picture provided by the present application. The stitching means 503 for stitching several of the processed pictures into an atlas.

According to some embodiments, the atlas processing device further includes: a generating means, generating an atlas mapper info file. The atlas mapper info file includes a name of the processed picture, a relative rotation angle between the processed picture and the corresponding picture to be processed, and coordinates of a center point of the processed picture, a width of the processed picture, and a height of the processed picture.

According to some embodiments, the coordinate O ($x_o$, $y_o$) of the center point of the processed picture is calculated by the following formula:

$$x_o = \frac{x_{max} + x_{min}}{2} + \Delta x$$

$$y_o = \frac{y_{max} + y_{min}}{2} + \Delta y$$

a width W of the processed picture is calculated by the following formula:

$$W = x_{max} - x_{min}$$

a height H of the processed picture is calculated by the following formula:

$$H = y_{max} - y_{min}$$

wherein, $x_{max}$ is the maximum value of first coordinates of pixels in the processed picture, $x_{min}$ is the minimum value of the first coordinates of the pixels in the processed picture, and $y_{max}$ is the maximum value of second coordinates of the pixels in the processed picture, $y_{min}$ is the minimum value of the second coordinates of the pixels in the processed picture, $\Delta x$ is an offset of the center point of the processed picture relative to an initial center point of the picture to be processed in a first direction. $\Delta y$ is an offset of the center point of the processed picture relative to the initial center point of the picture to be processed in a second direction, the first coordinates are coordinates in the first direction, and the second coordinates are coordinates in the second direction.

According to some embodiments, the specific steps performed by the generating means includes: writing a layer name corresponding to the processed picture into a name of the processed picture in accordance with a determination that layer names corresponding to the several processed pictures differ from one another; and writing the layer name and a layer serial number into the name of the processed picture, in accordance with a determination that layer names corresponding to two or more of the several processed pictures are the same, where the layer name and the layer serial number correspond to the processed pictures.

According to some embodiments, the specific steps performed by the second obtaining means includes: in accordance with a determination that the layer is not a text layer, a background layer or a hidden layer, taking a layer in the picture file in the PSD format as a picture to be processed.

Figure 13:
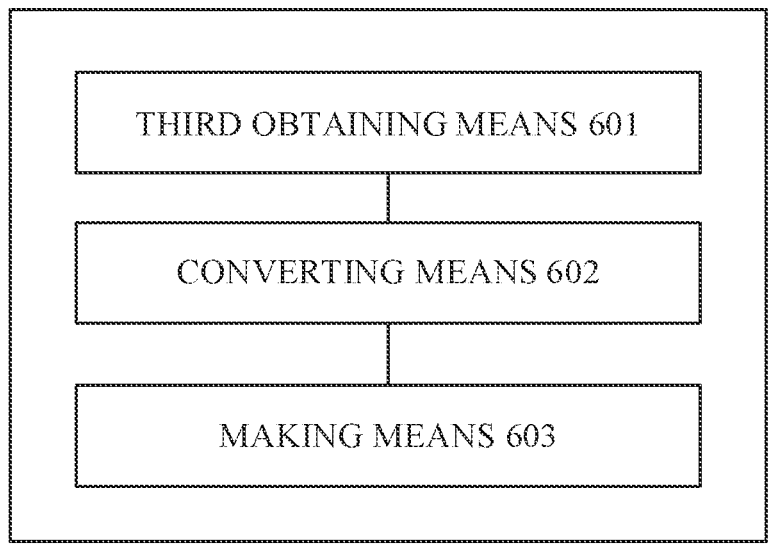
FIG. 13 is a block diagram of an apparatus of producing animation according to some embodiments of the present application.

Corresponding to the embodiments above, embodiments of the present application provide an apparatus of producing animation. FIG. 13 is a block diagram of the apparatus of producing animation according to some embodiments of the present application. As shown in FIG. 13, the apparatus includes: a third obtaining means 601, a converting means 602, and a making means 603.

The third obtaining means 601 for, obtaining an atlas corresponding to an animation, the atlas can be obtained by using any method of processing atlas provided by the present application, or the atlas can be obtained by using any apparatus of processing atlas provided by the present application. The converting means 602 for, converting each of the processed pictures in the atlas into an initial angle picture, where the initial angle picture is a picture formed by setting the processed picture at an angle of the picture to be processed. The making means 603 for, producing an animation based on all the initial angle pictures.

According to some embodiments, the specific steps performed by the converting means 602 includes: obtaining a center point and an angle parameter of the processed picture, where the angle parameter is a relative rotation angle between the processed picture and the corresponding picture to be processed, and rotating the processed picture around the center point of the processed picture according to the angle parameter.

Figure 14:
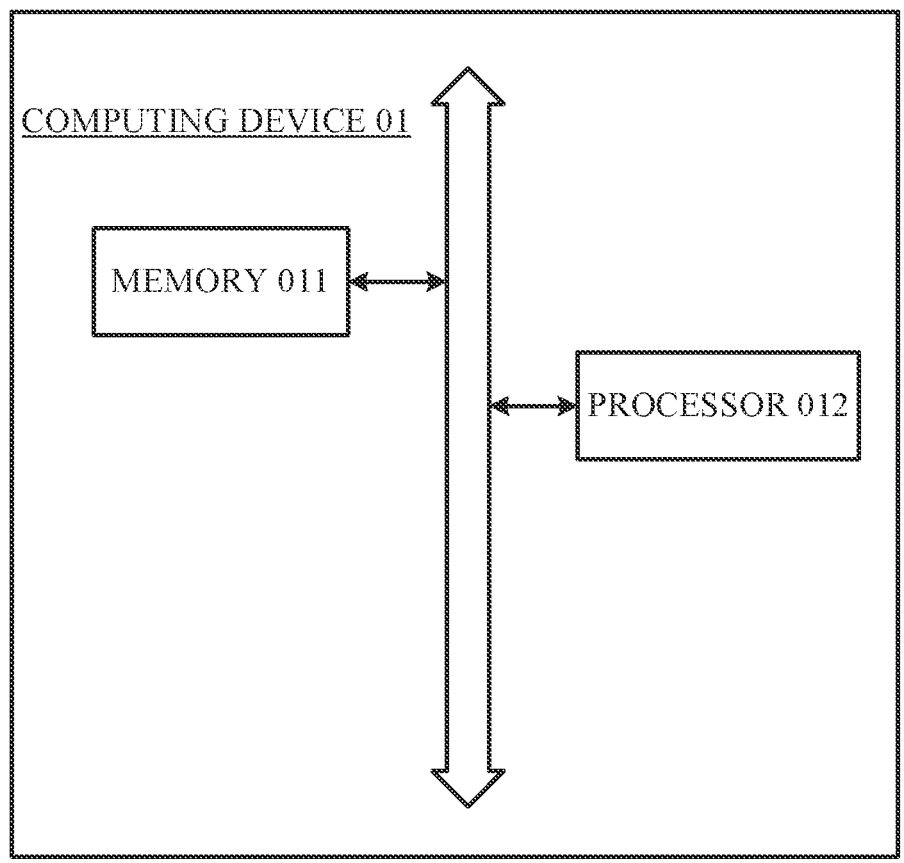
FIG. 14 is a hardware structure diagram of a computing device according to some embodiments of the present application.

The embodiments also provide a computing device, such as a smart phone, a tablet computer, a notebook computer, a desktop computer, a rack type server, a blade type server, a tower type server or a cabinet type server (including an independent server or a server cluster composed of a plurality of servers) that can execute programs. As shown in FIG. 14, the computing device 01 of the embodiments include, but is not limited to, a memory 011, a processor 012, as shown in FIG. 14. It should be noted that FIG. 14 shows only a computing device 01 having components as a memory 011 and a processor 012, but it is understood that it is not required to implement all of the shown components and that more or fewer parts can be implemented in lieu thereof.

In some embodiments, the memory 011 (that is, non-transitory computer-readable storage medium) includes a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc. In some embodiments, the memory 011 may be an internal storage module of the computing device 01 such as a hard disk or memory of the computing device 01. In other embodiments, the memory 011 may also be an external storage device of the computing device 01, such as a plugged hard disk provided on the computing device 01, a Smart Media Card (SMC), Secure Digital (SD) card, a Flash Card, and the like. Of course, the memory 011 may also include both an internal storage module and an external storage device of the computing device 01. In the embodiments, the memory 011 is generally used to store an operating system and various types of application software installed in the computing device 01 such as computer-readable instructions of the method of processing picture, the method of processing atlas, the method of producing animation described above and the like. In addition, the memory 011 may also be used to store various types of data that have been or will be outputted.

The processor 012, in some embodiments, may be a Central Processing Unit (CPU), a controller, a microprocessor, or other data processing chip. The processor 012 is generally used to control the overall operation of the computing device 01. In the embodiments, the processor 012 is used to run computer-readable instructions stored in the memory 011 or process data, such as computer-readable instructions of the method of processing picture, the method of processing atlas and the method of producing animation described above.

The embodiments further provide a non-transitory computer-program product tangibly embodied in a machine-readable non-transitory storage medium (e.g. non-transitory computer-readable storage medium) that includes instructions configured to cause one or more processors to perform operations including the method of processing picture described above.

In some embodiments, the computer-readable storage medium, such as, a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, servers, App application malls, etc. which stores computer programs, and when the computer programs are executed by a processor, corresponding functions are realized. The computer-readable storage medium of the embodiments is used to store the method of processing picture, the method of processing atlas or the method of producing animation, and when executed by the processor, the method of processing picture, the method of processing atlas or the method of producing animation provided by the above embodiments are implemented.

It should be noted that in this article, the terms "include", "contain" or any other variants thereof are intended to cover non-exclusive inclusion, so that a process, method, article or device including a series of elements not only includes those elements, or also includes other elements not explicitly listed, or elements inherent to the process, method, article, or device. Without more restrictions, the element defined by the sentence "including a . . . " does not exclude the existence of other identical elements in the process, method, article or device that includes the element.

Through the description of the above embodiments, those skilled in the art can clearly understand that the methods of the above embodiments can be implemented by means of software and a necessary general hardware platform. Of course, hardware can also be used, but in many cases the former is a better implementation.

The embodiments described above are merely illustrative embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method, comprising:
   obtaining a picture to be processed comprising taking a layer in a picture file to be processed as a picture to be processed, wherein the picture to be processed comprises a plurality of pixels, and the plurality of pixels comprise first pixels for forming an image and second pixels for forming an image background, and wherein the picture file to be processed comprises a plurality of layers;
   rotating the picture to be processed, wherein for each rotation angle, an intermediate picture is obtained;
   selecting at least two pictures from the picture to be processed and several intermediate pictures for calculating an area of a bounding box surrounding the image respectively; and
   removing second pixels outside the bounding box in a picture with the smallest area of bounding box to obtain a processed picture; and
   stitching several processed pictures into an atlas,
   wherein the method further comprises generating an atlas mapper info file, wherein the atlas mapper info file comprises a name of the processed picture, a relative rotation angle between the processed picture and the corresponding picture to be processed, coordinates of a center point of the processed picture, a width of the processed picture, and a height of the processed picture.

2. The method of claim 1, wherein the rotating the picture to be processed comprises rotating the picture to be processed at a predetermined interval angle within a predetermined angle range, and
   wherein the selecting at least two pictures from the picture to be processed and several intermediate pictures comprises selecting all pictures from the picture to be processed and the several intermediate pictures.

3. The method of claim 1, wherein coordinates of the pixels in a first direction are first coordinates, and coordinates in a second direction are second coordinates, wherein the first direction is perpendicular to the second direction, and wherein in the picture to be processed, the bounding box comprises two first edges extending in the first direction and two second edges extending in the second direction.

4. The method of claim 3, wherein the calculating the area of the bounding box surrounding the image in the picture to be processed comprises:
   for the picture to be processed, taking a group of the pixels with the same first coordinates as a pixel column, and in each pixel column, obtaining and writing a first pixel with the maximum value of the second coordinate and a first pixel with the minimum value of the second coordinate into a first array;
   taking a group of the pixels with the same second coordinates as a pixel row, and in each pixel row, obtaining and writing a first pixel with the maximum value of the first coordinate and a first pixel with the minimum value of the first coordinate into a second array;
   calculating an intersection of the first array and the second array to obtain an initial convex pixel array;
   in the initial convex pixel array, calculating a difference between the maximum value of the first coordinate and the minimum value of the first coordinate to obtain a first initial difference, and calculating a difference between the maximum value of the second coordinate and the minimum value of the second coordinate to obtain a second initial difference; and
   calculating a product of the first initial difference and the second initial difference to obtain the area of the bounding box surrounding the image in the picture to be processed.

5. The method of claim 4, wherein the rotating the picture to be processed comprises:
   determining a center of the bounding box of the image in the picture to be processed to obtain an initial center point; and
   rotating coordinates of each pixel in the initial convex pixel array around the initial center point to obtain an intermediate convex pixel array.

6. The method of claim 5, wherein the calculating the area of the bounding box surrounding the image in the intermediate picture comprises:
   in the intermediate convex pixel array, calculating a difference between the maximum value of the first coordinate and the minimum value of the first coordinate to obtain a first intermediate difference, and calculating a difference between the maximum value of the second coordinate and the minimum value of the second coordinate to obtain a second intermediate difference; and calculating a product of the first intermediate difference and the second intermediate difference to obtain the area of the bounding box surrounding the image in the intermediate picture.

7. The method of claim 2, wherein the predetermined angle range is 0 degree to 90 degrees, and the predetermined interval angle is 1 degree.

8. The method of claim 1, wherein the second pixels are transparent pixels, and the first pixels are non-transparent pixels.

9. The method of claim 1, wherein the obtaining a picture to be processed comprises:
obtaining a picture file in PhotoShop Document (PSD) format; and
obtaining a layer in the picture file to obtain the picture to be processed, and
wherein the method further comprises: storing the processed picture in Portable Network Graphics (PNG) format.

10. The method of claim 1, wherein the coordinates O ($x_o$, $y_o$) of the center point of the processed picture is calculated as:

$$x_o = \frac{x_{max} + x_{min}}{2} + \Delta x$$
$$y_o = \frac{y_{max} + y_{min}}{2} + \Delta y$$

the width W of the processed picture is calculated as:

$$W = x_{max} - x_{min}$$

the height H of the processed picture is calculated as:

$$H = y_{max} - y_{min}$$

wherein $x_{max}$ is the maximum value of first coordinates of pixels in the processed picture, $x_{min}$ is the minimum value of the first coordinates of the pixels in the processed picture, and $y_{max}$ is the maximum value of second coordinates of the pixels in the processed picture, $y_{min}$ is the minimum value of the second coordinates of the pixels in the processed picture, $\Delta x$ is an offset of the center point of the processed picture relative to an initial center point of the picture to be processed in a first direction, $\Delta y$ is an offset of the center point of the processed picture relative to the initial center point of the picture to be processed in a second direction, wherein the first coordinates are coordinates in the first direction, and the second coordinates are coordinates in the second direction.

11. The method of claim 1, wherein the generating an atlas mapper info file comprises:
writing a layer name corresponding to the processed picture into a name of the processed picture in accordance with a determination that layer names corresponding to the several processed pictures differ from one another; and
writing the layer name and a layer serial number corresponding to the processed picture into the name of the processed picture in accordance with a determination that layer names corresponding to two or more of the several processed pictures are the same.

12. The method of claim 1, wherein the taking a layer in a picture file to be processed as a picture to be processed comprises:
in accordance with a determination that the layer is not a text layer, a background layer or a hidden layer, taking the layer in the picture file as the picture to be processed.

13. The method of claim 1, further comprising:
obtaining the atlas;
converting each of the processed pictures in the atlas into an initial angle picture, wherein the initial angle picture is a picture formed by setting the processed picture at an angle of the picture to be processed; and
producing an animation based on all the initial angle pictures.

14. The method of claim 13, wherein the converting each of the processed pictures comprises:
obtaining a center point and an angle parameter of the processed picture, wherein the angle parameter is a relative rotation angle between the processed picture and the corresponding picture to be processed; and
rotating the processed picture around the center point of the processed picture according to the angle parameter.

15. A computing device, comprising:
one or more processors; and
one or more non-transitory computer-readable storage mediums containing instructions configured to cause the one or more processors to perform operations comprising:
obtaining a picture to be processed comprising taking a layer in a picture file to be processed as a picture to be processed, wherein the picture to be processed comprises a plurality of pixels, and the plurality of pixels comprise first pixels for forming an image and second pixels for forming an image background, and wherein the picture file to be processed comprises a plurality of layers;
rotating the picture to be processed, wherein for each rotation angle, an intermediate picture is obtained;
selecting at least two pictures from the picture to be processed and several intermediate pictures for calculating an area of a bounding box surrounding the image respectively;
removing second pixels outside the bounding box in a picture with the smallest area of bounding box to obtain a processed picture; and
stitching several processed pictures into an atlas,
wherein the operations further comprise generating an atlas mapper info file, wherein the atlas mapper info file comprises a name of the processed picture, a relative rotation angle between the processed picture and the corresponding picture to be processed, coordinates of a center point of the processed picture, a width of the processed picture, and a height of the processed picture.

16. The computing device of claim 15, wherein coordinates of the pixels in a first direction are first coordinates, and coordinates in a second direction are second coordinates, wherein the first direction is perpendicular to the second direction, and wherein in the picture to be processed, the bounding box comprises two first edges extending in the first direction and two second edges extending in the second direction.

17. The computing device of claim 16, wherein the calculating the area of the bounding box surrounding the image in the picture to be processed comprises:
for the picture to be processed, taking a group of the pixels with the same first coordinates as a pixel column, and in each pixel column, obtaining and writing a first pixel with the maximum value of the second coordinate and a first pixel with the minimum value of the second coordinate into a first array;

taking a group of the pixels with the same second coordinates as a pixel row, and in each pixel row, obtaining and writing a first pixel with the maximum value of the first coordinate and a first pixel with the minimum value of the first coordinate into a second array;

calculating an intersection of the first array and the second array to obtain an initial convex pixel array;

in the initial convex pixel array, calculating a difference between the maximum value of the first coordinate and the minimum value of the first coordinate to obtain a first initial difference, and calculating a difference between the maximum value of the second coordinate and the minimum value of the second coordinate to obtain a second initial difference; and calculating a product of the first initial difference and the second initial difference to obtain the area of the bounding box surrounding the image in the picture to be processed.

18. A non-transitory computer-program product tangibly embodied in a machine-readable non-transitory storage medium that comprises instructions configured to cause one or more processors to perform operations comprising:

obtaining a picture to be processed comprising taking a layer in a picture file to be processed as a picture to be processed, wherein the picture to be processed comprises a plurality of pixels, and the plurality of pixels comprise first pixels for forming an image and second pixels for forming an image background, and wherein the picture file to be processed comprises a plurality of layers;

rotating the picture to be processed, wherein for each rotation angle, an intermediate picture is obtained;

selecting at least two pictures from the picture to be processed and several intermediate pictures for calculating an area of a bounding box surrounding the image respectively;

removing second pixels outside the bounding box in a picture with the smallest area of bounding box to obtain a processed picture; and stitching several processed pictures into an atlas, wherein the operations further comprise generating an atlas mapper info file, wherein the atlas mapper info file comprises a name of the processed picture, a relative rotation angle between the processed picture and the corresponding picture to be processed, coordinates of a center point of the processed picture, a width of the processed picture, and a height of the processed picture.

* * * * *